(12) United States Patent  
Kagawa et al.

(10) Patent No.: US 6,850,476 B2  
(45) Date of Patent: Feb. 1, 2005

(54) OPTICAL RECORDING MEDIUM

(75) Inventors: Masaki Kagawa, Miyagi (JP); Ayumi Konishi, Miyagi (JP)

(73) Assignee: Sony Corporation, Tokyo (JP)

( * ) Notice: Subject to any disclaimer, the term of this patent is extended or adjusted under 35 U.S.C. 154(b) by 57 days.

(21) Appl. No.: 10/428,109

(22) Filed: May 2, 2003

(65) Prior Publication Data

US 2003/0198173 A1 Oct. 23, 2003

Related U.S. Application Data

(62) Division of application No. 08/719,262, filed on Sep. 24, 1996, now Pat. No. 6,618,345.

(30) Foreign Application Priority Data

Sep. 29, 1995 (JP) .......................................... P07-250985

(51) Int. Cl.[7] .................................................. G11B 7/00
(52) U.S. Cl. .................................................. 369/112.23
(58) Field of Search ........................ 369/112.23, 112.27, 369/112.01, 120, 121

(56) References Cited

U.S. PATENT DOCUMENTS 5,121,378 A * 6/1992 Hirose et al. .......... 369/112.28
5,450,237 A * 9/1995 Yoshida et al. ............. 359/562

6,618,345 B1 9/2003 Kagawa et al.

FOREIGN PATENT DOCUMENTS

EP 0558052 * 9/1993 ................. 369/112

* cited by examiner

*Primary Examiner*—Nabil Hindi  
(74) *Attorney, Agent, or Firm*—Oblon, Spivak, McClelland, Maier & Neustadt, P.C.

(57) ABSTRACT

An optical recording medium includes recording tracks located adjacently to each other and is provided on and/or from which information is recorded and/or reproduced by irradiating with a beam a predetermined track of those recording tracks. The track pitch between the adjacent recording tracks is adjusted so that the track pitch is made substantially equal to a distance between an intensity center of a beam spot on a laser beam irradiated plane of the medium and a location of an initial minimum intensity. By irradiating with a beam the predetermined track, therefore, the beam intensity is located around the center of the recording track that is adjacent to the minimum portion. This location results in reducing a crosstalk amount from the adjacent recording track to a minimum, thereby suppressing the loss of the crosstalk characteristic to a minimum. This makes it possible to enhance the recording density in the alignment direction of the recording tracks if an A/W in the optical system is 1.0 or lower, in which A denotes an effective radius of an objective lens in the alignment direction of the recording tracks and W denotes a beam spot size on the objective lens in the alignment direction of the recording tracks.

13 Claims, 5 Drawing Sheets

OPTICAL RECORDING MEDIUM

BACKGROUND OF THE INVENTION

1. Field of the Invention

The present invention relates to an optical recording medium for recording and/or reproducing information in which medium an A/W of an optical system is set to 1.0 or lower, where A is an effective radius of an objective lens in the alignment direction of recording tracks and W is a size of a light spot on the objective lens in the alignment direction of the recording tracks. In particular, the present invention relates to an optical recording medium which may be composed to suppress an adverse effect of crosstalk to a minimum by specifying a track pitch.

2. Description of the Related Art

In the field of information recording, recently, optical systems for recording data have been under study in many places. These optical information recording systems have various advantages such as recording or reproducing in a non-contact state, implementation of a higher recording density by one or more digits than a magnetic recording system, and adaptation to various types of memories like a reproduction dedicated type, a direct read after write type, and a rewritable type. In light of these advantages, the optical information recording system makes it possible to implement an inexpensive and a large volume of files and is used in a wide range of applications from industrial uses to domestic uses.

The dedicated reproduction type recording medium contains a digital audio optical disk on which music is recorded, an optical video disk on which picture data is recorded, an optical disk used for a storage unit of a computer and the like. The rewritable type recording medium may be a magneto-optical disk, for example.

These optical disks are more and more frequently required to have higher recording density. As one of the means for achieving the high recording density, the track pitch of the 3recording track is made narrower. In these optical disks, normally, the recording tracks are spirally formed as a recording area. That is, the recording tracks are located in the radial direction of the optical disk so that they are adjacent to each other. Hence, as the radial pitch between the recording tracks, that is, the track pitch is made narrower, more numerous recording tracks may be formed. This makes it possible to enhance the recording density. Typical track pitches adopted as the ISO standards, include for example 1.6 $\mu$m (ISO/IEC 10089), and 1.39 $\mu$m (ISO/IEC 13549).

In the case of recording and/or reproducing information on and/or from such an optical disk, a recording and/or reproducing ray of light such as a laser beam is applied to a predetermined recording track on the optical disk through an objective lens. As one of the optical system parameters for specifying an intensity distribution of the recording and/or reproducing ray of light on the light-applied plane of the optical disk, it is possible to refer to an A/W (Filling of Lens). If a laser beam (Gaussian beam) is used as the recording and/or reproducing ray of light applied onto the optical disk, the A/W is an index indicating how much the beam is kicked out through the objective lens, in which A denotes an effective radius of the objective lens and W is a spot size of a laser beam on the objective lens.

For example, if the A/W has a value of 1.0, the passage rate of the laser beam through the objective lens is 86.5%. If the MW has a larger value, the spot diameter of the laser beam on the light-applied plane of the optical disk is made narrower. In place, the side lobe of the laser beam is made smaller. If the A/W has a smaller value, the spot diameter is restricted, while the side lobe is made larger.

The spot size of the laser beam (Gaussian beam) on the objective lens depends on an angle of divergence of a laser diode served as a light source. In the initial stage of putting a product into practical use, the angle of divergence is made considerably variable. On the known standards, a considerable allowance is given to the A/W by considering the variety of the manufacturing processes. And, by considering this factor, the known track pitch is defined from a view of a groove-dependent signal, representatively, a push-pull signal or a crosstalk.

However, a recent request has risen for a far higher recording density of the optical disk. Hence, it is necessary to make the spot diameter of the laser beam the light-applied plane of the optical disk narrower. In order to respond to this requirement, the A/W has to be 1.0 or lower. Further, the variety of the A/W is likely to be restricted. Further, in recent days, the accuracy of the laser diode is remarkably improved. The variety of the A/W is more easily restricted. Hence, when defining the track pitch, the necessity for considering the variety of the A/W as a factor is made lower and lower. Further, it is more desirous to make the track pitch narrower and suppress the adverse effect of the crosstalk it a minimum. That is, it is desirous to compose an optical recording medium that makes it possible to enhance the recording density without having any adverse affect on the crosstalk characteristics.

SUMMARY OF THE INVENTION

It is an object of the present invention to provide an optical recording medium which records and/or reproduces information at the A/W value of 1.0 or lower and keeps the recording density higher without damaging the crosstalk characteristic, in which A/W a value of A is an effective radius of an objective lens in the alignment direction of the recording tracks and W is a spot size on the objective lens in the alignment direction of the recording tracks.

In order to achieve the foregoing object, as a result of acutely studying the composition, by making the distance between an intensity center of a laser spot and the initial minimum intensity in the radial direction of the laser spot, that is, a first Airy disk radius substantially equal to the pitch of the recording track and applying a laser beam to a predetermined recording track, the laser spot is located at the substantially central spot of the recording track to which the portion of the minimum intensity is adjacent. This location results in minimizing the crosstalk caused by the adjacent recording track, thereby preventing any adverse affect on the crosstalk characteristic.

The optical recording medium according to the invention is characterized in that information is recorded and/or reproduced by irradiating with a beam, a predetermined recording track of the adjacent tracks through an objective lens, and that the track pitch of the recording track is made substantially equal to the distance between the center of the intensity of the laser spot on the light-applied plane and the initial minimum intensity in the radial direction of the spot if the A/W of the optical system has a value of 1.0 or lower, in which A denotes an effective radius of the objective lens in the alignment direction of the recording tracks and W denotes a size of a beam spot on the objective lens in the alignment direction of the recording tracks.

Further, the optical recording medium according to the invention may be disk-like and is composed so that the plural recording tracks are arranged to be adjacent to each other in the radial direction.

Moreover, by keeping a value of A/W 0.5 or higher, it is possible to efficiently use a laser beam. This makes it possible to record and reproduce the information even with a low-power laser.

An optical recording medium according to the present invention is composed to keep the A/W of the optical system 1.0 or lower and make the track pitch of the recording track substantially equal to the distance between the center of the intensity of the beam spot on the light-applied plane and the point of the initial minimum intensity in the radial direction of the spot (for example, keep a difference between them 15% or less). Hence, if the predetermined recording track is irradiated with a laser beam, the beam spot is located at the substantially central spot of the recording track to which the minimum intensity portion is adjacent. This location results in reducing the crosstalk caused by the adjacent recording track to a minimum, and thus prevents causing any adverse crosstalk effect.

Further objects and advantages of the present invention will be apparent from the following description of the preferred embodiments of the invention as illustrated in the accompanying drawings.

DESCRIPTION OF THE PREFERRED EMBODIMENTS

Later, the effect of the present invention will be described on the basis of the experimental results.

Experiment 1

Experiment 1 is a numerical example. The experimental result contains numerical values and parameters. However, they do not define the present invention. In order to do a numerical experiment, FFT analysis is used based on the scalar analysis theory.

Figure 1:
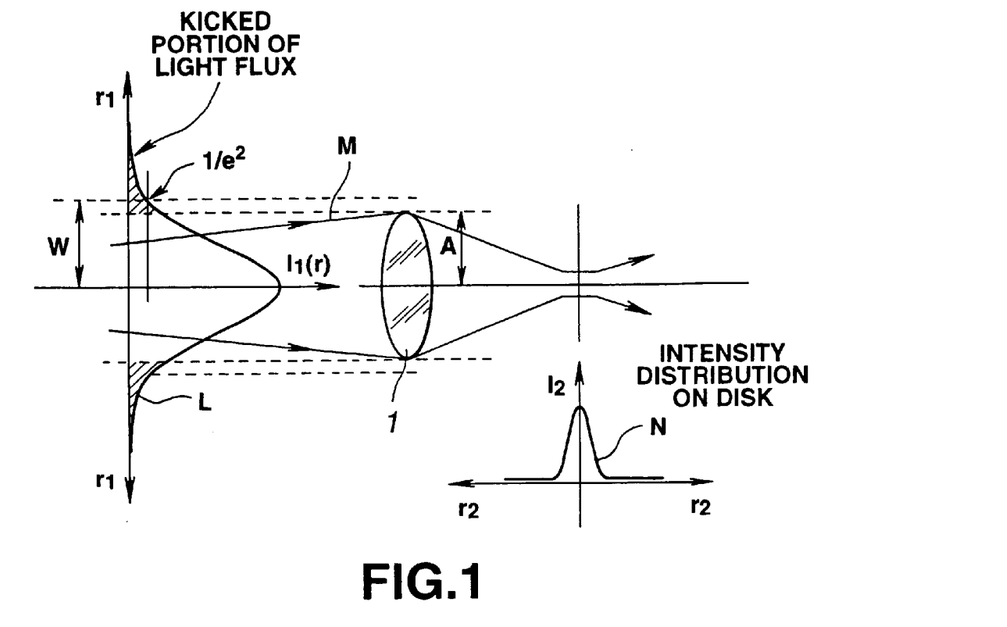
FIG. 1 is a model view showing a state where a laser beam is incident on an objective lens.

In the beginning, FIG. 1 exemplarily shows that a laser beam (Gaussian beam) is incident on an objective lens and irradiates a recording track. In a case that the laser beam indicated by an arrow M of FIG. 1 is passed through an objective lens 1 whose effective radius is shown by a mark A of FIG. 1, the laser beam has a spot diameter as indicated by a mark W of FIG. 1. If the A/W is 1.0, the laser spot contains 85.6% of the overall quantity of light.

If the distribution of the laser beam intensity as indicated by I1 (progressively increased toward the arrow) against the radial direction of the spot in the alignment direction of the recording tracks as indicated by an arrow r1 of FIG. 1 is indicated by a curve L of FIG. 1, the radius the intensity of which is made to be $1/e^2$ of the central intensity is a spot diameter W of the laser beam. On the other hand, the laser beam outside of the effective radius A of the objective lens 1 is kicked out by the objective lens 1 and thus does not reach the optical disk.

The light intensity distribution as indicated by $I_2$ of FIG. 1 (progressively increased toward the arrow) against the radial direction of the beam spot in the alignment direction of the recording tracks as indicated by $r_2$ of FIG. 1 contained within the laser spot on the laser beam irradiated plane of the optical disk is indicated by the curve of N of FIG. 1. The distribution of the intensity immediately before the entrance of the laser beam into the objective lens 1 is represented by the following formula 1.

$$I = \frac{2P}{\pi W^2} \exp\left(-\frac{2r^2}{W^2}\right)$$

Where $r \leq A$,
  I=0.0
Where $r > A$,
where W is a beam diameter, A is an effective radius of the objective lens, r is a distance from a beam center, P is a laser power, and I is an intensity.

This expression is Fourier-transformed for gaining the form of the laser beam condensed on the optical disk. If the A/W is zero, the laser beam is a plane wave. If the A/W is ∞, the laser beam is a complete Gaussian beam. In both cases, the corresponding expressions can be analytically obtained. In the other cases, however, the laser beam is required to be studied through the effect of the numeral analysis. Further, the actual values may be measured by a beam profiler, for example.

Figure 2:
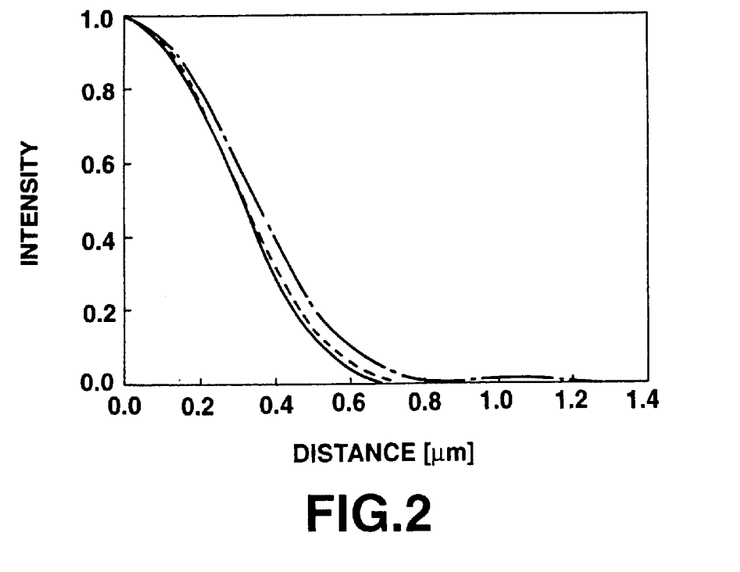
FIG. 2 is a characteristic view showing an intensity distribution of a laser beam.

Next, the research is directed to the intensity distribution of laser beam on the laser beam irradiated plane of the optical disk at various A/Ws. Concretely, FIG. 2 shows the normalized result in which the wavelength is 680 nm, the numerical aperture (NA) is 0.55, and the central intensity is 1. In FIG. 2, an ordinate axis denotes an intensity and an abscissa axis denotes a distance from the center of the intensity in the alignment direction of the recording tracks. The curve of the alternate long and short dash line shows the result when the A/W is 1.0. The broken curve of FIG. 2 shows the result when the A/W is 0.5. The solid curve of FIG. 2 shows the result when the A/W is 0.1.

Figure 3:
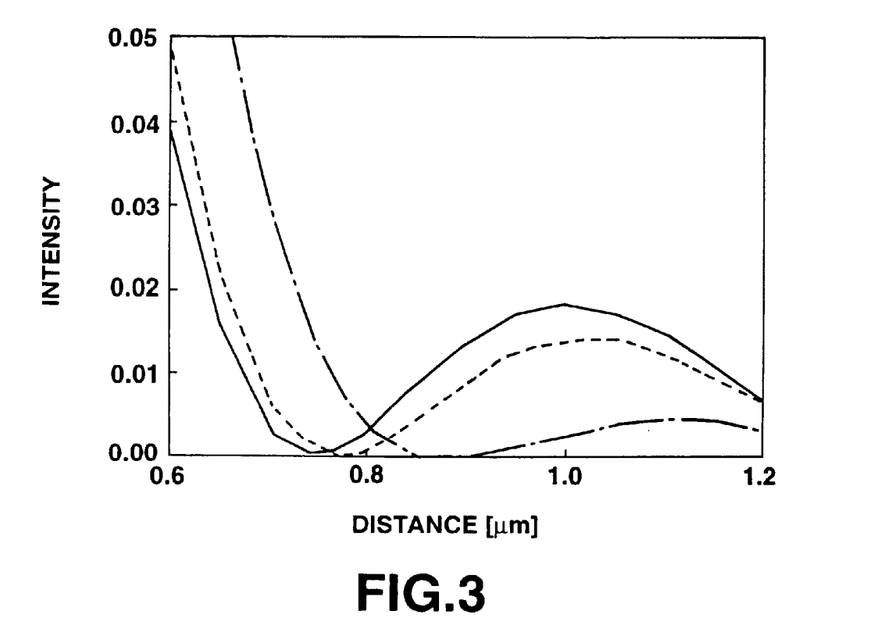
FIG. 3 is a characteristic view showing a partially expanded intensity distribution of a laser beam.

FIG. 3 is an expanded view showing a side lobe part of the intensity distribution shown in FIG. 2. In FIG. 3, the ordinate axis denotes an intensity and the abscissa axis denotes a distance from the center of the intensity in the alignment direction of the recording tracks. The curve of the alternate long and short dash line of FIG. 3 shows the result when the A/W is 1.0. The broken curve of FIG. 3 shows the result when the A/W is 0.5. The real curve of FIG. 3 shows the result when the A/W is 0.1.

It was confirmed by these results that with the reduction of the A/W, the spot diameter is reduced and the side lobe is increased. Further, the result indicated that there exists a portion of zero intensity, the radius of which is called a first Airy disk radius.

By making the radius of the first Airy disk substantially equal to the track pitch, if a predetermined recording track is irradiated with a laser beam, a portion of minimum intensity is located at the center of the recording track located adjacently to the predetermined track. Thus, it is possible to suppress the adverse effect of the crosstalk to a minimum.

In the actual optical system, the influence of various aberrations do not guarantee the constant existence of the radius of zero intensity. However, when normalizing the new disk system, at the stage of designing the optical system, the derivation of the intensity distribution of the laser beam with the parameters and the corresponding design of the track pitch to the intensity distribution are effective in improving the margin of the overall system.

Experiment 2

Figure 4:
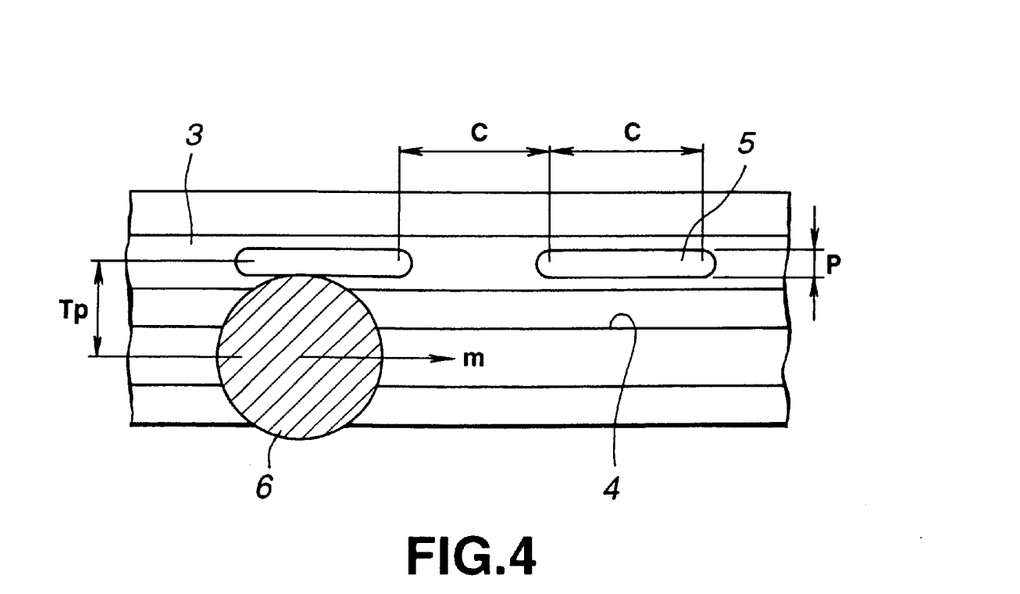
FIG. 4 is a plane view showing a structure of an magneto-optical disk according to an embodiment of the present invention.
Figure 5:
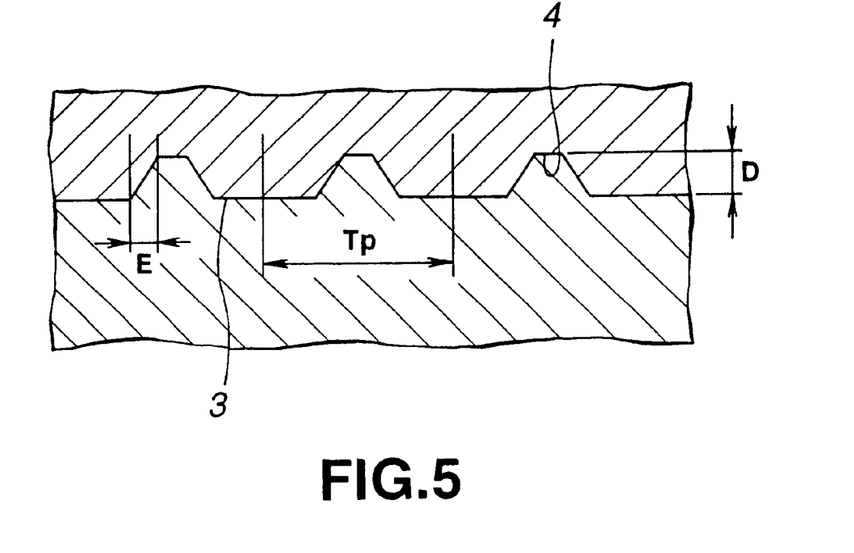
FIG. 5 is a sectional view showing a structure of an magneto-optical disk according to an embodiment of the present invention.

Next, in order to confirm the effect of the invention, a numerical experiment was executed. Concretely, on the assumption of a magneto-optical disk that has a land recording system with a commonly used guide groove, as shown in FIGS. 4 and 5, a rack pitch as indicated by Tp defined by the widths of the land 3 and the guide groove 4 is varied and a MO pit 5 is formed at the center of the land 3 corresponding to the recording track located adjacently to the predetermined track. If the beam spot 6 is run on the predetermined recording track as indicated by an arrow m in the recording track direction, the signal amount leaked from the adjacent track to the predetermined track is calculated out.

The guide groove 4 is formed to spread toward the opening. That is, the groove 4 has a substantially trapezoid section. The depth as indicated by D is $\lambda/8$ ($\lambda$ is a wavelength of a recording and reproducing beam). The width of the flat bottom is 0.1 $\mu$m. The width of the slope indicated by E is 0.1 $\mu$m. The period of the MO pit 5 indicated by C is 1.2 $\mu$m. The width of the MO pit 5 indicated by P is 0.3 $\mu$m. The calculated result is normalized so that the land level is made constant.

Figure 6:
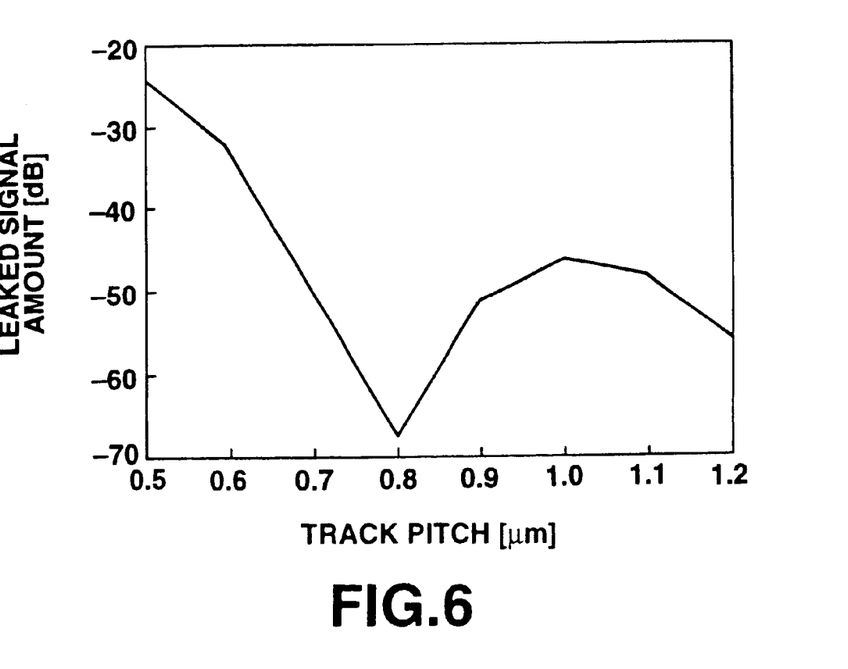
FIG. 6 is a characteristic view showing a relation between a track pitch and a leakage signal amount.

Then, the wavelength of the recording and reproducing beam is assumed to be 680 nm. The NA is 0.55. The A/W in the radial direction of the magneto-optical disk, in other words, the alignment direction of the recording tracks is set as 0.8. In these states, the experimental result is shown in FIG. 6. In these states, the distance from the intensity center of the beam spot to the location of the initial minimum intensity in the radial direction of the beam spot, that is, the radius of the first Airy disk is about 0.81 $\mu$m.

The result of FIG. 6 indicated the following fact. The leaked signal amount is increased as the track pitch is made smaller. When the track pitch is made smaller than 1.0 $\mu$m, the leaked signal amount is decreased once. When the track pitch is 0.8, the leaked signal amount takes a minimum value and then is abruptly increased.

That is, if the track pitch is made substantially equal to the radius of the first Airy disk, the track pitch is made narrower for enhancing the recording density. At a time, the signal amount leaked from the adjacent track is made minimum. It brought about no loss of the crosstalk characteristic.

The ISO standards to be used if such an optical system is used are now under study. As a reference, as of March 1995, the track pitch of 1.15 $\mu$m is the most promising value.

Figure 7:
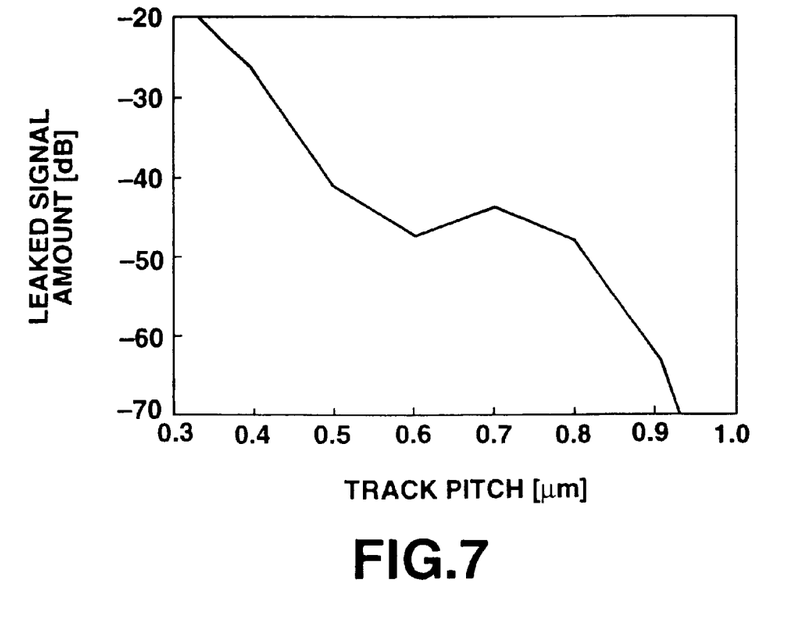
FIG. 7 is a characteristic view showing another relation between a track pitch and a leakage signal amount.

Next, if a blue laser is used for the optical system, the result is shown in FIG. 7. In this experiment, the magneto-optical disk is assumed to have the substantially same form as the foregoing disk, except that the guide groove has a V-character section, the depth is $\lambda/8$ and the width of the slope is 0.1 $\mu$m.

Further, the wavelength of the recording and reproducing beam is 480 nm. The NA is 0.55. The A/W appearing in the radial direction of the magneto-optical disk, in other words, the alignment direction of the recording track is set to 0.8. In these states, the distance from the central intensity of the beam spot to the location of the initial minimum intensity in the radial direction of the beam spot, that is, the radius of the first Airy disk is made to be about 0.58 $\mu$m.

The result of FIG. 7 has the similar tendency to that of FIG. 6. As the track pitch is made smaller, the leaked signal amount is increased. When the track pitch is made smaller than 0.7 $\mu$m, the leaked signal amount is decreased once. When the track pitch is 0.6, the leaked signal amount takes a minimum value and then is abruptly increased.

That is, this result indicated that by making the track pitch substantially equal to the radius of the first Airy disk, the track pitch is made narrower for enhancing the recording density and the signal amount leaked from the adjacent track is made minimum. Further, it brought about no loss of the crosstalk characteristic.

The proceeding confirmed these results. If the A/W of the optical system is. 1.0 or lower, by making the track pitch substantially same as the radius of the first Airy disk, that is, the distance from the intensity center of the beam spot to the location of the initial minimum intensity in the radial direction of the beam spot, the track pitch may be made narrower for achieving the recording density. This makes it possible to suppress the signal amount leaked from the adjacent track and the loss of the crosstalk characteristic to a minimum. Further, by making the track pitch smaller than the radius of the first Airy disk, the signal amount leaked from the adjacent track is abruptly increased. Further, the radius of the first Airy disk corresponds to the lower limit of the track pitch.

Experiment 3

In succession, the research is directed to the influence of the relation between the track pitch and the first Airy disk radius of the actual magneto-optical disk on the crosstalk characteristic. That is, as to four types of magneto-optical disk samples 1 to 4 having the corresponding track pitches of 1.10 $\mu$m, 1.00 $\mu$m, 0.95 $\mu$m and 0.85 $\mu$m, a crosstalk amount is researched by recording and reproducing a repetitive signal having a mark length of about 2.0 $\mu$m in the optical system in which the recording and reproducing be has the wavelength of 680 nm, the objective lens has an NA of 0.55 and the A/W in the recording track alignment direction, that is, the radial direction of the magneto-optical disk is 0.61. In addition, in the optical system, the first Airy disk has a radius of about 0.77 $\mu$m.

Figure 8:
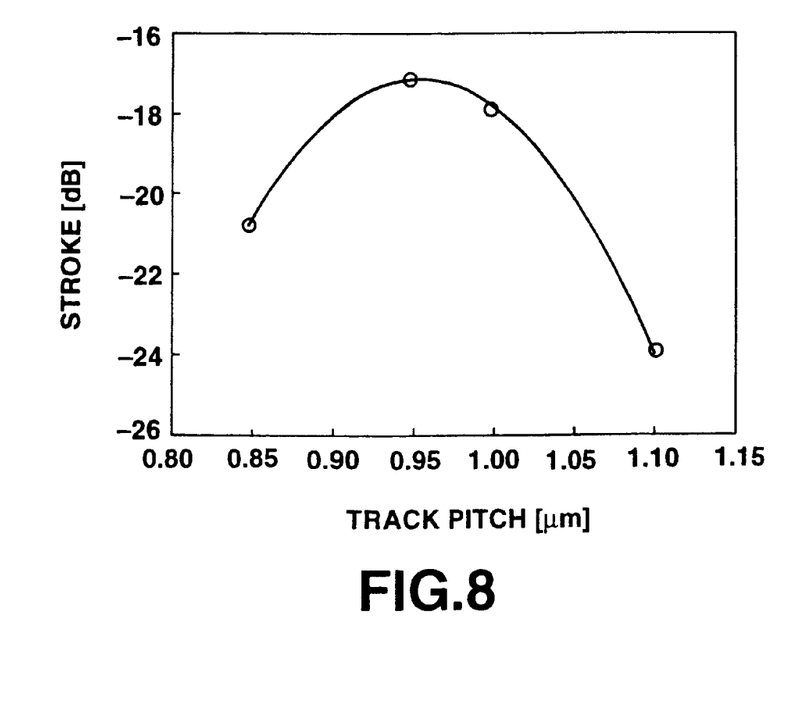
FIG. 8 is a characteristic view showing a relation between a track pitch and a crosstalk amount.

The result of this research is illustrated in FIG. 8. The abscissa axis denotes a track pitch and the ordinate axis denotes a crosstalk amount. As is obvious from this result, the curve shown in FIG. 8 had the same tendency as the portion having a track pitch of 0.8 or larger as shown in FIG. 6. The curve further indicated that the narrower track pitch of 0.85 $\mu$m than about 1.0 $\mu$m, that is, the closer track pitch to the radius-of the first Airy disk brings about a smaller crosstalk amount. That is, this result indicated that as the closer track pitch to the first Airy disk radius shows a more excellent crosstalk characteristic.

If the magneto-optical disk is radially inclined, the aberration serves to change the form of the side lobe of the laser beam. This change has an influence on the crosstalk amount from the adjacent track. Then, the influence was estimated by measuring the bit error rate. For this estimation, the magneto-optical disk samples 1 and 4 are used. These samples 1 and 4 have the corresponding track pitches of 1.10 μm and 0.85 μm. The optical system used therefor is arranged so that the recording and reproducing beam has the foregoing wavelength of 680 nm, the objective lens has an NA of 0.55, and the A/W in the alignment direction of the recording tracks, that is, the radial direction of the magneto-optical disk is 0.61.

Figure 9:
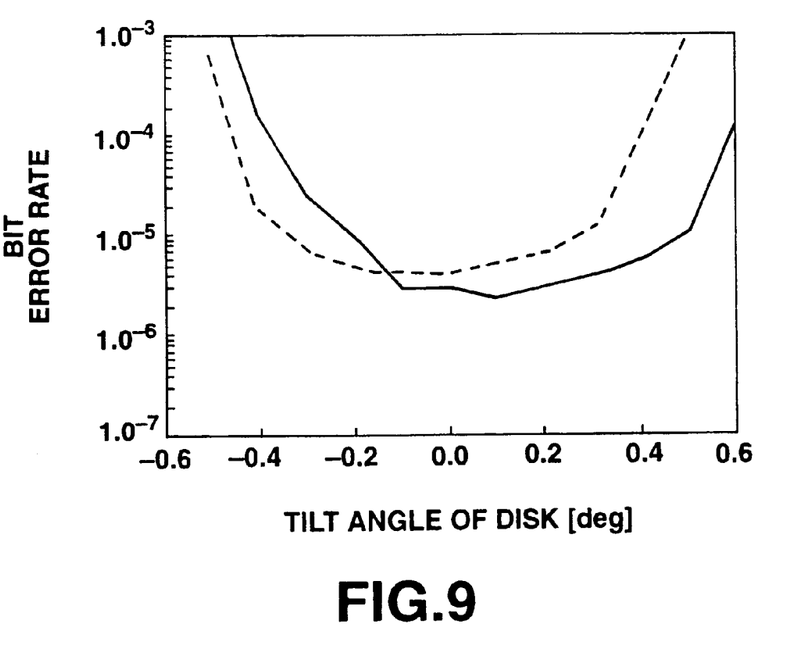
FIG. 9 is a characteristic view showing a relation between a disk tilt angle and a bit error rate.

The result of the estimation is illustrated in FIG. 9. The abscissa axis denotes a tilt angle of the disk and the ordinate axis denotes a bit error rate. The solid line indicates the result of the magneto-optical disk sample 1. The broken line indicates the result of the magneto-optical disk 4. As shown in FIG. 9, the curve is not depicted around the tilt angle of 0 degree. This is because of the limitation of the mechanical accuracy.

Assuming that the practical upper limit of the error rate is $10^{-5}$, the result of FIG. 9 indicated that the curve has an allowance of ±0.35 degrees around the tilt angle of 0 degree in the magneto-optical disk sample 1 having the track pitch of 1.10 μm. In the magneto-optical disk sample 4 having the track pitch of 0.85 μm, the curve has an allowance of ±0.3 degrees around the disk tilt of 0 degree.

That is, if the track pitch is made smaller, it is possible to protect the bit error rate characteristic from being lowered by adjusting this track pitch to be close to the radius of the first Airy disk. It was confirmed that this adjustment lowers the influence of the crosstalk.

The aforementioned experiments have concerned the magneto-optical disk. In actuality, however, the present invention may apply to any optical recording medium on and/or from which information is recorded and/or reproduced by applying a beam on a predetermined track of the recording tracks located adjacently to each other.

As is clarified from the above description, the optical recording medium according to the present invention is composed to keep the A/W 1.0 or lower for enhancing the recording density and make the track pitch of the recording track substantially equal to the distance between the intensity center of the beam spot on the light-applied plane and the spot of the initial minimum intensity in the radial direction of the track. If a laser beam is applied to the predetermined recording track, the beam spot is located at the substantially central spot of the recording track to which the portion of the minimum light intensity is adjacent. This location results in reducing the crosstalk caused by the adjacent recording track to a minimum, thereby not adversely affecting the crosstalk characteristic. Hence, the optical recording medium achieves the high recording density in the alignment direction of the recording tracks without having to consider the adverse effect of the crosstalk.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical recording medium on which information is recorded and/or reproduced by irradiating with a beam, comprising:
   a plurality of recording tracks having a minimized track pitch, wherein the track pitch between the recording tracks is substantially equal to a distance from a center of a beam spot on a light-applied plane of the medium to a radially disposed intensity threshold point within the beam spot,
   wherein the beam spot includes at least three regions including,
      a first region located between the center of the beam spot and the radially disposed intensity threshold point, wherein an intensity of the beam spot is greater than a threshold intensity and sufficient to record and/or reproduce information when the medium is irradiated,
      a second region located beyond the radially disposed intensity threshold point, wherein the intensity of the beam spot can vary between a value greater than zero and less than the threshold intensity, and wherein the intensity of the beam spot is insufficient to allow recording and/or reproduction of information then the medium is irradiated, and
      a third region located beyond the second region in a radial direction, wherein the intensity of the beam spot is zero.

2. An optical recording medium on which information is recorded and/or reproduced by irradiating with a beam, comprising:
   a plurality of recording tracks having a minimized track pitch, wherein the track pitch between the recording tracks is substantially equal to a distance from a center of a beam spot on a light-applied plane of the medium to a radially disposed intensity threshold point within the beam spot,
   wherein the beam spot includes at least three regions including,
      a first region located between the center of the beam spot and the radially disposed intensity threshold point, wherein an intensity of the beam spot is greater than a threshold intensity and sufficient to record and/or reproduce information when the medium is irradiated,
      a second region located beyond the radially disposed intensty threshold point, wherein the intensity of the beam spot varies between zero and the threshold intensity, and wherein the intensity of the beam spot is insufficient to allow recording and/or reproduction of information when the medium is irradiated, and
      a third region located beyond the second region in a radial direction, wherein the intensity of the beam spot is zero.

3. The optical recording medium of claim 2,
   wherein information is recorded and/or reproduced through the effect of an optical system, and
   wherein the optical system has a ratio of an effective radius of an objective lens in the alignment direction of the recording tracks to a beam spot size on the objective lens in the alignment direction of the recording tracks between approximately ½ and 1.

4. An optical recording medium on which information is recorded and/or reproduced by irradiating with a beam, comprising:
   a plurality of recording tracks wherein the track pitch between the recording tracks is approximately equal to a distance from a center of a varying intensity beam spot on a light-applied plane of the medium to a radially disposed intensity threshold point within the varying intensity beam spot,
   wherein the varying intensity beam spot includes at least three regiens including,
      a first region located between the center of the beam spot and the radially disposed intensity threshold point, wherein an intensity of the varying intensity beam spot is greater than a threshold intensity and sufficient to record and/or reproduce information when the medium is irradiated, a second region located beyond the radially disposed intensity threshold point, wherein the intensity of the varying intensity beam spot can vary between a value greater than zero and less than the threshold intensity, and wherein the intensity of the varying intensity beam spot is insufficient to allow recording and/or reproduction of information when the medium is irradiated, and a third region located beyond the second region in a radial direction, wherein the intensity of the varying intensity beam spot is zero, wherein information is recorded and/or reproduced through the effect of an optical system, and wherein the optical system has a ratio of an effective radius of an objective lens in the alignment direction of the recording tracks to a beam spot size on the objective lens in the alignment direction of the recording tracks between approximately ½ and 1.

5. A method of recording/reproducing information onto/from a recording medium including a plurality of tracks having a minimized track pitch using an optical system including a objective lens, comprising the steps of:

generating a beam having an initial effective diameter;

aperturing said beam such that only a portion of said beam is accepted and said minimized track pitch is substantially equal to a first Airy disk of a beam spot to be irradiated at said recording medium; and focusing said accepted portion of said beam onto a light-applied plane of said recording medium, wherein the aperturing step includes the step of selecting the aperture size such that the effective size of said accepted portion is at least half of the initial effective diameter of said beam.

6. The method of claim 5, wherein the aperturing size selecting step includes the step of selecting the aperture size such that the effective size of said accepted portion is no more than 90% of the initial effective diameter of said beam.

7. A method of recording/reproducing information onto/from a recording medium including a plurality of tracks having a minimized track pitch using an optical system including a objective lens, comprising the steps of:

generating a beam having an initial effective diameter;

aperturing said beam such that only a portion of said beam is accepted and said minimized track pitch is substantially equal to a first Airy disk of a beam spot to be irradiated at said recording medium; and focusing said accepted portion of said beam onto a light-applied plane of said recording medium, wherein the aperturing step includes the step of selecting the diameter of said objective lens to be less than the initial effective diameter of said beam, and wherein the objective lens diameter selecting step includes the step of selecting said diameter of said objective lens to be at least half of the initial effective diameter of said beam.

8. The method of claim 7, wherein the objective lens diameter selecting step includes the step of selecting said diameter of said objective lens to be no more than 90% of the initial effective diameter of said beam.

9. A recording medium having a plurality of tracks having minimized track pitch and information recorded thereon, the recording medium being prepared by the steps of:

generating a beam having an initial effective diameter;

aperturing said beam such that only a portion of said beam is accepted and said minimized track pitch is substantially equal to a first Airy disk of a beam spot to be irradiated at said recording medium; and focusing said accepted portion of said beam onto a light-applied plane of said recording medium, wherein the aperturing step includes the step of selecting the aperture size such that the effective size of said accepted portion is at least half of the initial effective diameter of said beam.

10. The recording medium of claim 9, wherein the aperture size selecting step includes the step of selecting the aperture size such that the effective size of said accepted portion is no more than 90% of the initial effective diameter of said beam.

11. A recording medium having a plurality of tracks having minimized track pitch and information recorded thereon, the recording medium being prepared by the steps of:

generating a beam having an initial effective diameter;

aperturing said beam such that only a portion of said beam is accepted and said minimized track pitch is substantially equal to a first Airy disk of a beam spot to be irradiated at said recording medium; and focusing said accepted portion of said beam onto a light-applied plane of said recording medium, wherein the aperturing step includes the step of selecting the diameter of said objective lens to be less than the initial effective diameter of said beam, wherein the objective lens diameter selecting step includes the step of selecting said diameter of said objective lens to be at least half of the initial effective diameter of said beam.

12. The retarding medium of claim 11, wherein the objective lens diameter selecting step includes the step of selecting said diameter of said objective lens to be no more than 90% of the initial effective diameter of said beam.

13. The optical recording medium of claim 1, wherein said track pitch is less than 1.15 micrometers.

* * * * *

UNITED STATES PATENT AND TRADEMARK OFFICE
CERTIFICATE OF CORRECTION

PATENT NO.   : 6,850,476 B2
DATED        : February 1, 2005
INVENTOR(S)  : Masaki Kagawa et al.

It is certified that error appears in the above-identified patent and that said Letters Patent is hereby corrected as shown below:

Column 1,
Line 38, change "have higher" to -- have a higher --.
Line 40, change "3recording" to -- recording --.
Line 67, change "the MW" to -- the A/W --.

Column 2,
Line 27, change "it a" to -- to a --.

Column 5,
Line 21, change "rack" to -- track --.

Column 6,
Line 46, change "be" to -- beam --.
Line 63, insert -- Next in the actual magneto-optical disk, the recording and reproducing beam is not always incident on the magneto-optical disk vertically. The incident angle of the beam is slipped from the right angles. By considering this, the relation between a tilt angle and an error rate of the magneto-optical disk was researched --.

Column 8,
Line 15, change "then" to -- when --.
Line 38, change "intensty" to -- intensity --.
Line 65, change "regiens" to -- regions- --.

Signed and Sealed this

Nineteenth Day of July, 2005

JON W. DUDAS
*Director of the United States Patent and Trademark Office*